United States Patent
Künzel et al.

(10) Patent No.: US 7,108,227 B2
(45) Date of Patent: Sep. 19, 2006

(54) INSULATION PACKAGE AND USE THEREOF

(75) Inventors: Hartwig Künzel, Holzkirchen (DE); Andreas Holm, Weyam (DE); Theo Grosskinsky, Holzkirchen (DE)

(73) Assignee: Fraunhofer-Gesellschaft zur Förderung der Angewandten Forschung E.V., (DE)

( * ) Notice: Subject to any disclaimer, the term of this patent is extended or adjusted under 35 U.S.C. 154(b) by 205 days.

(21) Appl. No.: 10/845,965

(22) Filed: May 14, 2004

(65) Prior Publication Data

US 2004/0245391 A1 Dec. 9, 2004

Related U.S. Application Data

(63) Continuation-in-part of application No. PCT/EP02/12565, filed on Nov. 11, 2002.

(30) Foreign Application Priority Data

Nov. 14, 2001 (DE) ............................ 101 55 925

(51) Int. Cl.
*B64C 1/40* (2006.01)
(52) U.S. Cl. ............................ 244/119; 244/133; 428/76
(58) Field of Classification Search ............ 244/117 A, 244/119, 133; 428/76
See application file for complete search history.

(56) References Cited

U.S. PATENT DOCUMENTS 4,585,683 A * 4/1986 Curnow ................. 428/71
5,445,856 A * 8/1995 Chaloner-Gill ............ 428/35.9
6,007,026 A * 12/1999 Shorey .................... 244/171.8
6,068,907 A * 5/2000 Beauregard ................. 428/71

FOREIGN PATENT DOCUMENTS

| DE | 19849696 A1 | 5/2000 |
| DE | 19857483 A1 | 6/2000 |
| EP | 0816582 A | 1/1988 |
| EP | 1002739 A2 | 5/2000 |
| WO | WO 96 33321 A | 10/1996 |

OTHER PUBLICATIONS

Copy of International Search Report dated Feb. 4, 2003.

* cited by examiner

*Primary Examiner*—Robert P. Swiatek
(74) *Attorney, Agent, or Firm*—Young & Basile, P.C.

(57) ABSTRACT

An insulation package to reduce the transmission of heat and/or noise between the outer skin and the cabin lining of an aircraft composed of an insulating material enclosed by an encapsulating membrane. The encapsulating material has a vapor diffusion resistance ($s_d$ value) at least partially dependent on the ambient humidity, and for a gradient of relative humidity across the encapsulating membrane of 3% to 50% it has a vapor diffusion resistance ($s_d$ value) of at least 0.8 m and for a gradient of relative humidity across the encapsulating membrane of 50% to 93% it has a maximum vapor diffusion resistance ($s_d$ value) of 0.3 m.

8 Claims, 1 Drawing Sheet

INSULATION PACKAGE AND USE THEREOF

This application is a Continuation-In-Part of International Application No. PCT/EP02/12565 filed Nov. 11, 2002, currently pending.

FIELD OF THE INVENTION

The present invention relates to an insulation package to reduce heat transmission between the outer skin and the cabin lining of an aircraft. Such insulation packages are used to insulate heat and noise from the surrounding surfaces of the cockpit and cabin in aircraft.

BACKGROUND OF THE INVENTION

The insulation packages are normally attached in the area of the outer metal skin of the aircraft. They represent primary insulation, while in many cases an additional secondary insulation in the form of insulation packages is applied directly to the cabin lining.

For safety reasons and for easier handling, the insulation packages consist of non-combustible and/or hard-to-ignite mats of insulating material (mostly of mineral wool) which, as with a cushion, are enclosed by an encapsulating membrane.

At cruising altitude, surfaces temperatures of −30° C. and below prevail on the outer metal skin of the aircraft. This is the equivalent of a saturation vapor pressure of less than 40 Pa. The air in the cabin is at a relative humidity of about 15%, even without any comfort-related air humidification. At a cabin temperature of 23° C., this is the equivalent of a vapor pressure of about 400 Pa, ten times the saturation vapor pressure at the outer skin. As a result of the pressure differential, a diffusion flow into the insulation packages in the primary insulation is created if the cabin air can penetrate behind the lining through leaks, which is normally the case. The insulating material in the insulation packages slowly becomes more moist during the flight as a result of the resulting condensate. Once the aircraft is on the ground, the outer skin warms up and the insulation packages can dry out again to a limited extent. In order to prevent excessive entry of moisture during the flight, the conventional encapsulating membrane in the insulation package has a fixed vapor diffusion resistance of about 1m of diffusion-equivalent air layer thickness ($s_d$ value). An encapsulating membrane of this type results in increased moisture in the insulation packages, which can lead to additional energy-inefficient weight and an increase in fuel consumption as well as condensate dripping from the cabin ceiling. The increase in cabin air humidity planned for the future to improve the physiological air quality in aircraft will, in all probability, further increase the condensate problems in the insulation packages.

SUMMARY OF THE INVENTION

It is therefore the object of the present invention to make available an insulation package in which moisture does not accumulate and thus additional energy-inefficient weight, an increase in fuel consumption or dripping condensate in aircraft can be avoided. This object is achieved by the insulation packet to reduce the transmission of heat and/or noise between the outer skin and the cabin lining of an aircraft comprising an insulating material enclosed by an encapsulating membrane, characterized in that the encapsulating material has at least partially a water vapor diffusion equivalent air layer thickness ($s_d$ value) dependent on ambient humidity and in accordance with DIN 52615 in the dry range (3%–50% relative humidity) has a water vapor diffusion equivalent air layer thickness ($s_d$ value) of at least 0.8 m and in the humid range (50%–93% relative humidity) has a water vapor diffusion equivalent air thickness ($s_d$ value) of 0.3 m maximum as well as by its application in an aircraft with an outer skin and a cabin lining disposed parallel to the outer skin at a predetermined distance, characterized in that insulation packages are located in the space between the outer skin and the cabin lining. Advantageous further developments of the insulation package under the invention are further described.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

The use of insulating packages under the invention using encapsulating membranes in accordance with the invention with a variable vapor diffusion resistance brings about a reduction in the absorption of moisture at high altitude and at the same time the insulation packages can be dehumidified when the aircraft is on the ground.

The encapsulating membranes under the invention are advantageously designed in such a way that they have an $s_d$ value of about 1 m under in-flight humidity and temperature conditions. Their vapor diffusion resistance during the flight-induced condensation period is approximately as high as with the previously employed encapsulating films. Under conditions on the ground, when the insulation packages can dry out again (evaporation period), the $s_d$ value is advantageously lower by a factor of 3 than during the condensation period during flight, so that drying out is correspondingly accelerated. This can be advantageously achieved by selecting a membrane whose vapor diffusion resistance depends on ambient conditions in the following way: in accordance with DIN 52615 the $s_d$ value of the membrane at 23° C. in the dry range (3%–50% relative humidity) should be at least 0.8 m, and in the humid range (50%–93% relative humidity) should be a maximum of 0.3 m. Since all the functional layers used in the aircraft capsule should be as light as possible, it is advantageous to target in addition a base weight of less than 20 g/m² for the membrane.

Membranes which possess these properties are, for example, polyamide-based films (PA6, PA66, PAA6, PA4 and mixed polyamides) between 10 and 20 μm in thickness. Polyamide is hard to ignite (fire protection rating B1), so that such films can also be employed from a fire-protection standpoint. In partial drawing A in the single FIG. 1, a cross-section is shown through an aircraft fuselage. This aircraft fuselage has an outer skin 2, to which a cabin lining 3 attaches internally concentric to the outer skin 2. Between outer skin 2 and cabin lining 3 there is a space in which the insulating packages according to the invention are installed. They fill the air gap 4 between outer skin 2 and cabin lining 3 completely or partially. Further in FIG. 1A reference number 5 represents a cabin air inlet, 6 an air vent (zonal dryer), 7 a hat rack (above the overhead bin), 8 a Sarma rod, 9 a dado panel, 10 an insulation package, 11 a stringer (attaching device), 12 a triangular area below the passenger level and 13 is a duct for blending cabin air and air from the air gap 4 between outer skin 2 and cabin lining 3.

Figure 1A:
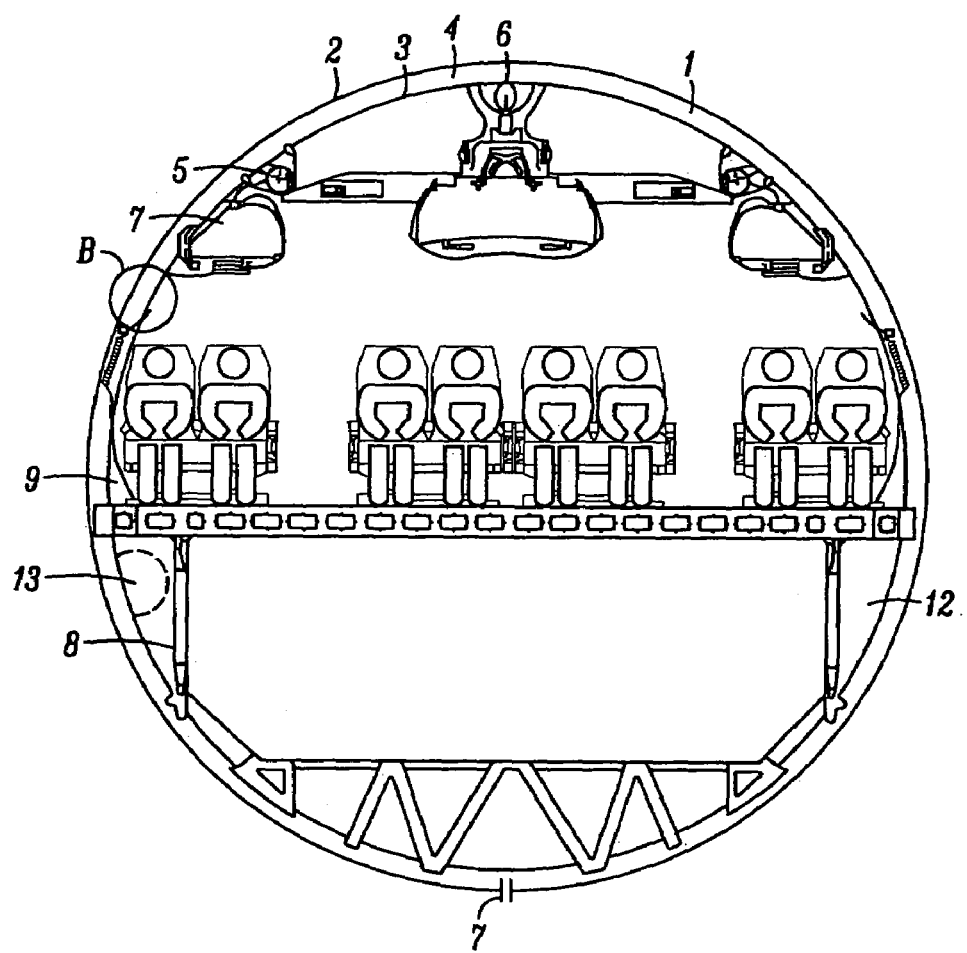
FIG. 1A is a cross sectional view through an aircraft fuselage.
Figure 1B:
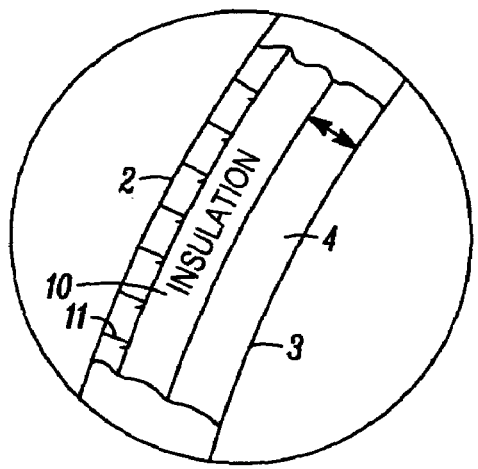
FIG. 1B is a cross sectional view through outer skin of the aircraft fuselage.

FIG. 1B shows a cross section through the outer skin of the aircraft fuselage as it is circled and identified in FIG. 1A as B. Consistent reference numbers are used in FIG. 1. in its entirety.

In accordance with the invention, the insulation package 10 shown in FIG. 1B is enclosed by a polyamide 6 membrane having a thickness of 18 μm. Like conventional insulation packages, it prevents the penetration of condensate moisture into the mineral wool filling of the insulation package 10 at high altitude, and on the ground it permits any moisture that has penetrated to dry out from the mineral wool filling of the insulation package 10 to the environment.

What is claimed is:

1. Insulation package to reduce the transmission of heat and/or noise between the outer skin and the cabin lining of an aircraft comprising an insulating material enclosed by an encapsulating membrane, characterized in that the encapsulating membrane has at least partially a water vapor diffusion equivalent air layer thickness ($s_d$ value) dependent on ambient humidity and in accordance with DIN 52615 in the dry range (3%–50% relative humidity) has a water vapor diffusion equivalent air layer thickness ($s_d$ value) of at least 0.8 m and in the humid range (50%–93% relative humidity) has a water vapor diffusion equivalent air thickness ($s_d$ value) of 0.3 m maximum.

2. Insulation package in accordance with claim 1 wherein in accordance with DIN 52615 the water vapor diffusion equivalent air layer thickness ($s_d$ value) in the dry range (3%–50% relative humidity) is at least three times the water vapor diffusion equivalent air layer thickness ($s_d$ value) in the humid range (50%–93% relative humidity).

3. Insulation package in accordance with claim 1 wherein the encapsulating membrane has at least sectionally a base weight of less than 30 g/m².

4. Insulation package in accordance with claim 1 wherein the encapsulating membrane is a film which at least partially contains polyamide or a mixture of polyamides or consists thereof.

5. Insulation package in accordance with claim 1, wherein the encapsulating membrane is a film of polyamide 4, polyamide 6, polyamide 46, polyamide 66 or a mixture thereof.

6. Insulation package in accordance with claim 1 wherein the encapsulating membrane has a thickness at least partially of between 10 μm and 20 μm.

7. Insulation package in accordance with claim 1 wherein the insulating material contains mineral wool or consists thereof.

8. Aircraft with an outer skin and a cabin lining disposed parallel to the outer skin at a predetermined distance, characterized in that insulation packages in accordance with one of the preceding claims are located in the space between the outer skin and the cabin lining.

\* \* \* \* \*